United States Patent [19]
Kornrumpf et al.

[11] 3,821,630
[45] June 28, 1974

[54] COMMUTATION FAILURE DETECTION AND CONTROL FOR SCR INVERTERS

[75] Inventors: William P. Kornrumpf; John P. Walden; Loren H. Walker, all of Schenectady, N.Y.

[73] Assignee: General Electric Company, Schenectady, N.Y.

[22] Filed: Aug. 2, 1973

[21] Appl. No.: 384,989

[52] U.S. Cl.................... 321/11, 321/12, 321/43, 307/252 M
[51] Int. Cl. ............................................. H02m 1/18
[58] Field of Search .............................. 321/11–14, 321/45 C, 2, 43; 307/252 M

[56] References Cited
UNITED STATES PATENTS

| | | | |
|---|---|---|---|
| 3,502,957 | 3/1970 | Fried et al. | 321/11 |
| 3,654,541 | 4/1972 | Kelly, Jr. | 321/13 |
| 3,681,676 | 8/1972 | Bourbeau | 321/11 |
| 3,728,557 | 4/1973 | Pelly et al. | 321/13 |
| 3,733,538 | 5/1973 | Kernick et al. | 321/45 C |
| 3,760,258 | 9/1973 | Percorini et al. | 321/11 |

Primary Examiner—William M. Shoop, Jr.
Attorney, Agent, or Firm—Jerome C. Squillaro; Josph T. Cohen

[57] ABSTRACT

A direct current-to-alternating current inverter employing a silicon controlled rectifier (SCR) is described in which control means is provided to promptly and automatically restore inverter operation after a commutation failure. The control means includes means for sensing the instantaneous voltage across the SCR and comparing this voltage with a threshold voltage. Whenever the SCR voltage is lower than the threshold voltage, the gating pulses to the SCR and a series connected chopper of the inverter are inhibited. When the threshold voltage is exceeded, gating pulses are passed to the SCR and the chopper, thereby providing normal inverter operation.

9 Claims, 5 Drawing Figures ns. If for any
COMMUTATION FAILURE DETECTION AND CONTROL FOR SCR INVERTERS

The present invention relates to electrical conversion systems and more particularly to conversion systems including protection means responsive to varying load conditions.

Electrical conversion systems, such as those employing recitification and derectification generally employ silicon controlled rectifiers, hereinafter referred to as SCR's. In these conversion systems, commutation of the SCR is provided during each cycle by energy storage in capacitor or inductor, for example. If for any reason the SCR should fail to commutate, the usual consequence is a short circuit across the D.C. bus providing the input power to the inverter. To prevent damage of the SCR and other related circuitry, fast-acting fuses and circuit breakers, for example, are commonly employed to open the short. The blowing of the fuse or opening of circuit breakers removes the inverter from the line and hence requires replacement of the fuse or closing of circuit breaker to restore the inverter to service.

The requirement for high reliability and maintenance-free inverters has forced designers to select energy storage elements with large safety margins to assure that commutation occurs reliably even during transients in source voltage or load impedance. This requirement for large commutation safety margins has tended to limit the use of SCR inverters in such applications as high frequency lighting and heating where the load impedance is erratic or underfined, reliability without maintenance is essential, or where economic factors prevent use of large safety margins in selecting commutating energy storage elements.

It is therefore an object of this invention to provide a simple control means to promptly and automatically restore inverter operation after a commutation failure.

It is a further object of this invention to provide reliable inverter operation with only a small safety margin in commutation energy storage.

It is a further object of this invention to provide detection and correction of commutation failures without overstressing the inverter components.

It is still another object of this invention to return the inverter to normal operation as soon as the fault has cleared.

Briefly, these and other objects of our invention are achieved in accord with one embodiment thereof wherein a D.C.-to-A.C. inverter including a series connected current controlling device, such as a chopper, is connected to an SCR in parallel with a load impedance. Means are provided for comparing the instantaneous voltage across the SCR with a selectively variable threshold voltage and providing an inhibit signal when the instantaneous voltage of the SCR is below the threshold voltage. The inhibit signal prevents triggering of the SCR and the chopper until the instantaneous voltage across the SCR exceeds the threshold voltage. Means are also provided for automatically restarting the inverter as soon as circuit conditions are appropriate for commutating action.

A better understanding of our invention as well as other objects and further advantages thereof will become more apparent to those skilled in the art from the following detailed description, taken in conjunction with the accompanying drawings in which.

Figure 1:
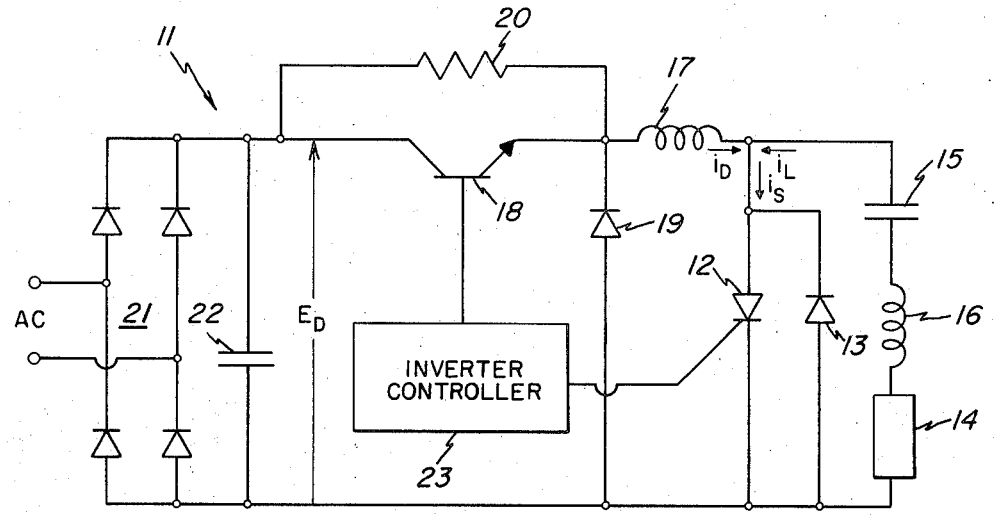
FIG. 1 is a simplified schematic diagram of a typical inverter circuit.

FIG. 1 illustrates a resonant-load single SCR inverter 11 comprising SCR 12 connected in parallel relationship with an oppositely poled diode 13. The SCR 12 is operatively connected to a load 14 through a series resonant circuit comprising capacitor 15 and inductor 16. As is customary, the natural resonant frequency of capacitor 15 and inductor 16 is higher than that of the gating pulses applied to the SCR 12.

The inverter 11 is powered from a controlled D.C. voltage source through an inductor 17 from a current controlling device such as a transistor chopper 18 and diode 19 which operate as a time ratio controller in this embodiment of the invention. Resistor 20 connected between the collector and emitter electrodes of the transistor chopper 18 is preferably of a high ohmic value and has negligible effect on normal operation of the chopper, but provides a current path for charging the capacitor 15 during normal starting and periods of inverter malfunction. The precise function of this resistor will also be described more fully below. The transistor chopper 18 is connected to a suitable D.C. voltage source such as that provided by a bridge rectifier 21 and a filter capacitor 22 and if desired, a filter choke.

Figure 2:
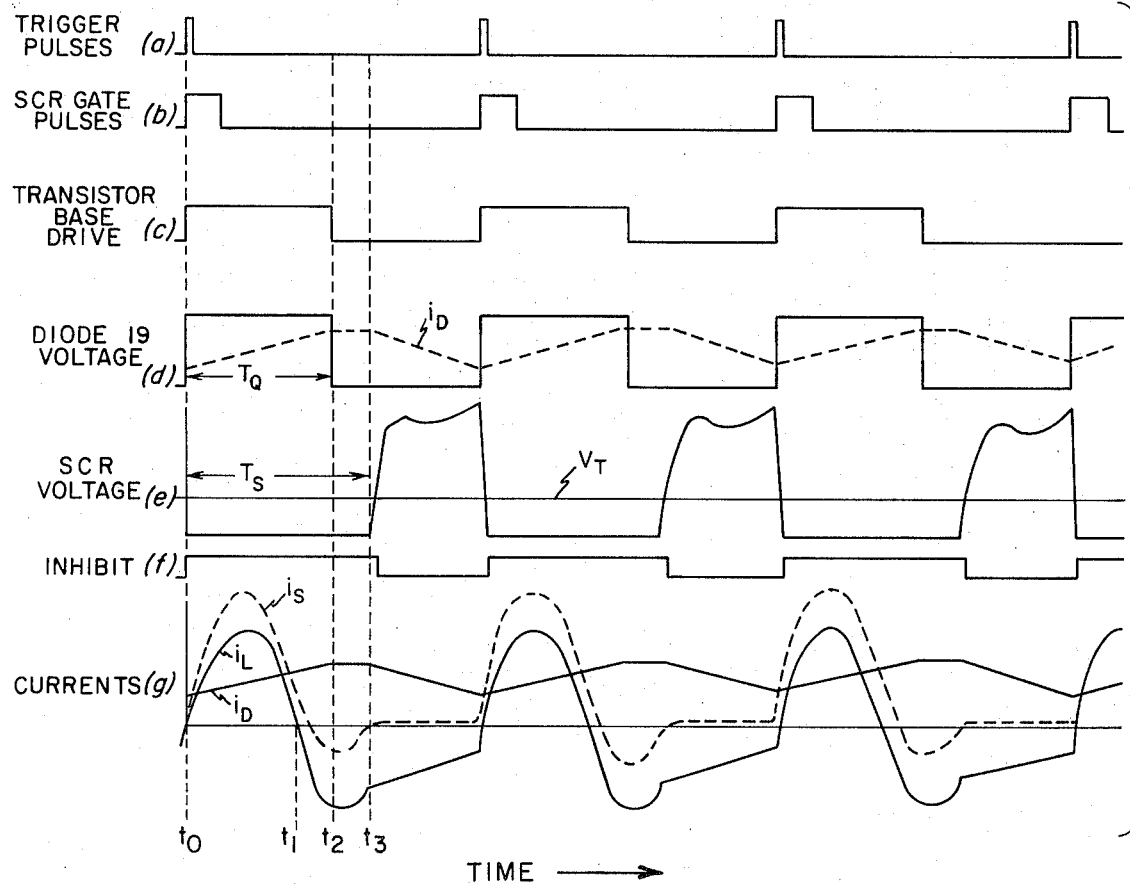
FIG. 2 illustrates typical waveforms associated with the operation of the inverter circuit of FIG. 1.

The operation of the inverter circuit of FIG. 1 is best described in conjunction with the waveforms of FIG. 2. In normal operation, the transistor chopper 18 and SCR 12 are gated simultaneously from a controller 23. Line $a$ of FIG. 2 illustrates the trigger pulses which establish the frequency of operation of the inverter 11. Lines $b$ and $c$, respectively, illustrate the SCR gating pulses and the transistor base drive pulses which are synchronized with the trigger pulses. The conduction time, After $T_Q$, of the chopper transistor 18 may vary, for example, from approximately 5 to 95 percent of the full cycle time, and determines the desired power level of circuit operation. The conduction time of SCR 12 and diode 13, is illustrated on line $e$ of FIG. 2 as the time period, $T_S$. This conduction time is determined by the resonant circuit impedance and load impedance and is not directly affected by the turnoff time of the chopper transistor 18. The current level, $i_D$, in the inductor 17, however, is determined by both the transistor conduction time and the SCR 12 and diode 13 conduction times, since the input voltage, $E_D$, is impressed across the inductor 17 when both the transistor and the SCR-diode combination are in conductions.

In normal operation, as shown on line $g$ of FIG. 2, the current in the resonant load, $i_L$, is a damped sine wave with a peak value much larger than the direct current, $i_D$, in the inductor 17. On each firing of the SCR 12, a positive half sine wave of current flows into the load 14 (time, $t_0$ to $t_1$). Since the negative half sine wave of the load current, $i_L$, is still larger than the direct current, $i_D$, there is a period of net forward current in diode 13. This forward current in diode 13 provides a reverse bias voltage of approximately ¾ to 1 volt on SCR 12, which lasts for a sufficiently long period of time to permit SCR 12 to recover its blocking capability. AFter the current, $i_S$, in the SCR 12 and diode 13 becomes approximately 0, the direct current, $i_D$, flows into the resonant load, recharging capacitor 15 in preparation for the next cycle of operation.

Figure 3:
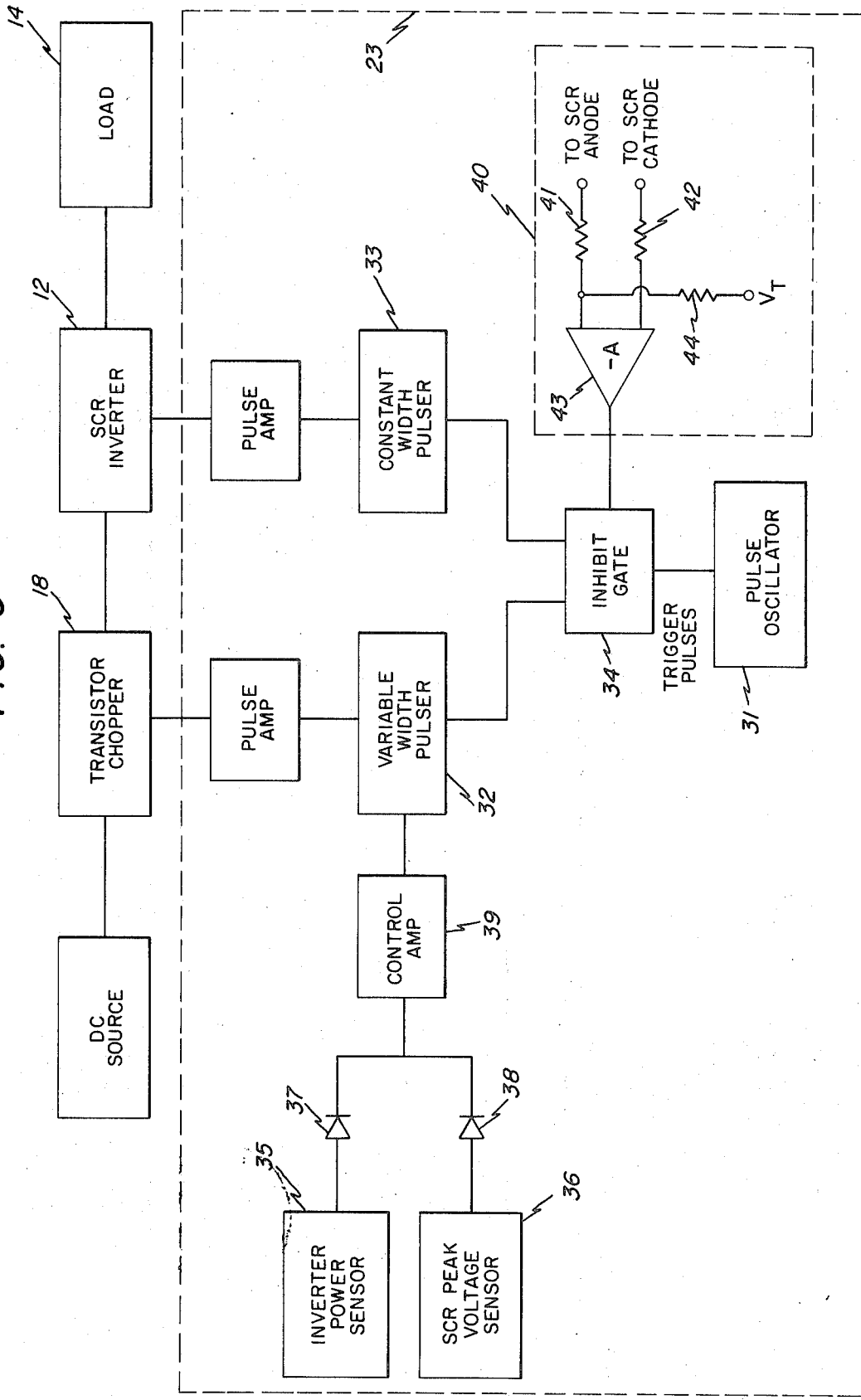
FIG. 3 is a block diagram of an inverter including a protection circuitry in accord with one embodiment of our invention.

FIG. 3 illustrates in block diagram form the inverter 11 and the controller 23 for the transistor chopper 18 and SCR inverter 12. The controller 23 includes a pulse oscillator 31 for providing trigger pulses to a variable width pulser 32 and a constant width pulser 33 through an inhibit gate 34. The duration of the pulse applied to the base electrode of the transistor chopper 18 is controlled by an inverter power sensor 35 and SCR peak voltage sensor 36 which are coupled through diodes 37 and 38, respectively, to a control amplifier 39 which in turn controls the width of the pulse to the transistor chopper 18. In this way, when loads are normal, the power sensor 35 controls the transistor chopper 18 and maintains constant power in the load; when load impedance is very high or very low, so that rated power cannot be delivered, the SCR peak voltage sensor 36 controls the transistor chopper 18 to limit peak forward voltage on SCR 12 to a safe level.

In accord with our invention, the inverter 11 is protected from the occurrence of a commutation failure (i.e., the failure to cause the SCR 12 to recover to its blocking state and permit capacitor 15 to charge, such as may result from line or load transients or electrical noise) by protective control means which senses a commutation failure and interrupts the inverter operation promptly and as briefly as possible to permit resumption of normal operation. This function is provided in accord with one embodiment of our invention by a sensor which senses the instantaneous voltage across the SCR 12 and a comparator which compares the sensed voltage with a selectively variable threshold voltage and either permits or inhibits pulses normally applied to the transistor chopper 18 and the SCR 12. More specifically, when the instantaneous voltage on the SCR is higher than a predetermined threshold voltage (indicating normal commutation), the gating pulses to the transistor chopper 18 and SCR 12 are applied to the respective devices from the variable width pulser 32 and the constant width pulser 33. However, when the instantaneous voltage across the SCR is below the predetermined value of threshold voltage (indicating a commutation failure), the gating pulses are inhibited.

FIG. 3 illustrates suitable protective control means 40 for sensing the instantaneous voltage across the SCR and for comparing this voltage with a selectively variable voltage, $V_T$. The control means 40 includes resistors 41 and 42, each having one end thereof connected to the differential inputs of an operational amplifier 43. The other ends of resistors 41 and 42 are connected to the anode and cathode, respectively, of the SCR 12. The instantaneous voltage of the SCR 12 is compared with the reference threshold voltage, $V_T$, through a resistor 44 connected between one input of the operational amplifier 43 and the threshold voltage $V_T$.

Operationally, when the SCR voltage is lower than the threshold voltage $V_T$, the output of the operational amplifier 43 produces an inhibit signal at inhibit gate 34 preventing the passage of trigger pulses from the pulse oscillator 31 from reaching the variable width pulser 32 and the constant width pulser 33. When the instantaneous voltage across the SCR 12 is higher than the threshold voltage $V_T$, the trigger pulses from the pulse oscillator 31 are permitted to pass to the variable width pulser 32 and the constant width pulser 33.

The operation of the inverter with its novel protective control means will now be described with reference to the waveforms illustrated in FIGS. 2, 4 and 5. FIG. 2 illustrates normal operation of the inverter wherein line $e$ illustrates the instantaneous voltage across the SCR 12 and line $f$ illustrates the inhibit signal issuing from the operational amplifier 43. As can be seen from these two illustrations, an inhibit signal is generated whenever the instantaneous voltage across the SCR 12 falls below the threshold voltage $V_T$. The inhibit signal releases shortly after $t_3$ when the SCR instantaneous voltage rises above the threshold voltage $V_T$, so that the next trigger pulse is allowed to start a new cycle of operation.

Figure 4:
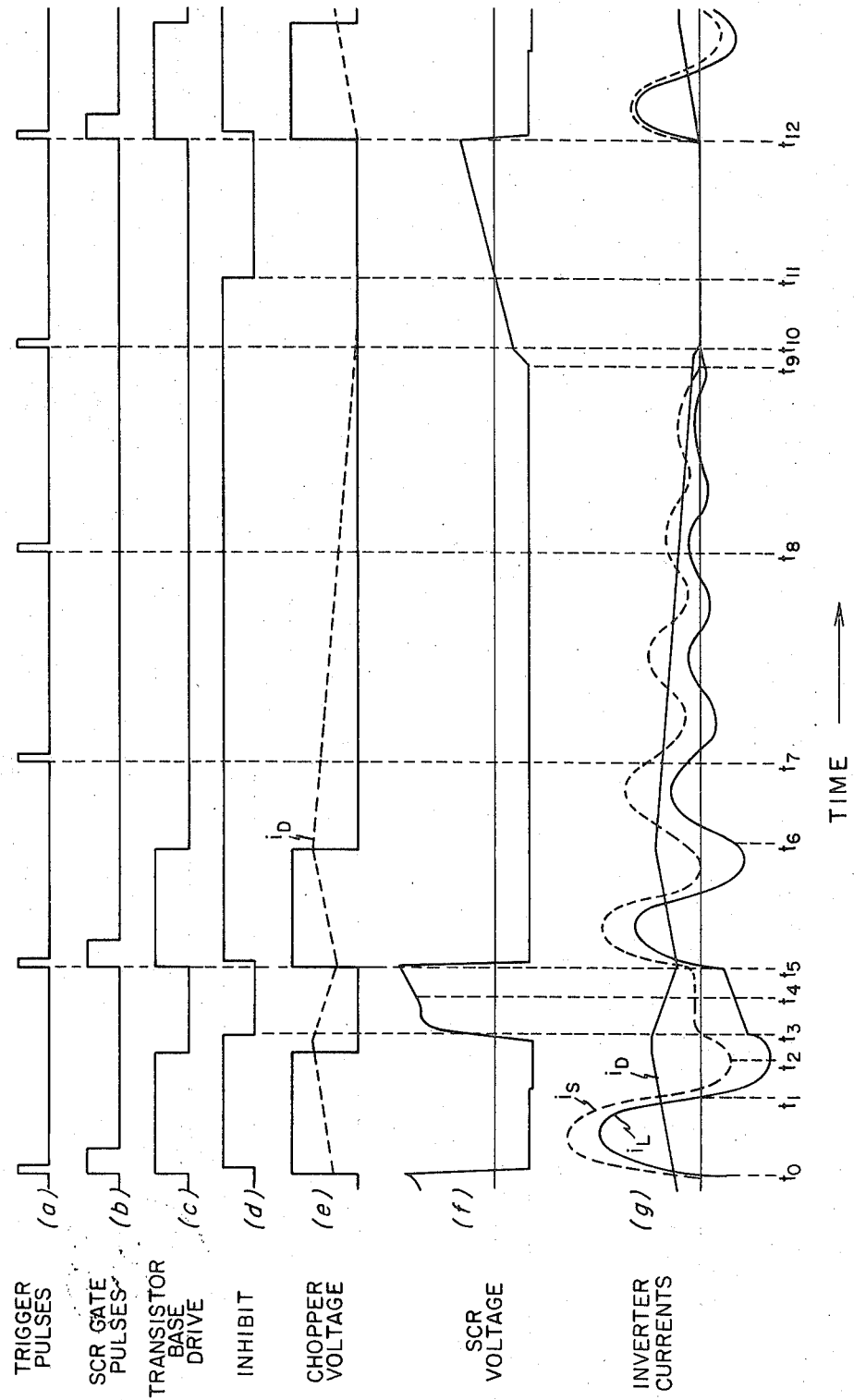
FIGS. 4 and 5 illustrate waveforms associated with the operation of the inverter of FIG. 3.

FIG. 4 illustrates the operation of the protective control means in the case of a commutation failure due to a high impedance load. In FIG. 4, the first cycle of operation is normal, except that at time $t_4$, the load impedance is increased by some external event. On the next cycle of operation, the resonant load current, $i_L$, is much smaller than on the first cycle so that the second half cycle does not exceed the direct current, $i_D$. Since the net current, $i_S$, in the SCR remains in the forward direction, the commutation which should have occurred at time $t_6$ does not occur. The instantaneous voltage across the SCR remains below the threshold voltage so that the inhibit signal (line $d$ of FIG. 4) which started at time $t_5$ continues through times $t_7$, $t_8$, and $t_{10}$, times at which the transistor and SCR gate pulses would otherwise have occurred.

In the absence of input power, both the direct current, $i_D$, and the load current, $i_L$, decay until the SCR current reaches 0 at time $t_9$. It should be noted, however, that even with the commutation failure, none of the currents exceeded normal values. Further, once the SCR current falls below its holding current, the SCR recovers its voltage blocking ability at time $t_9$. After this time, the small current provided through resistor 20 (FIG. 1) charges the commutating capacitor 15 at a rate determined by the resistor-capacitor time constant. At time $t_{11}$, the protective control means senses the restored SCR voltage and removes the inhibit signal so that the next trigger pulse at time $t_{12}$ starts normal operation again. If the cause of the high impedance load has been removed, normal operation will continue from this point on. If, however, the high impedance remains, the operation illustrated in FIG. 4 repeats until the load impedance returns to normal.

Figure 5:
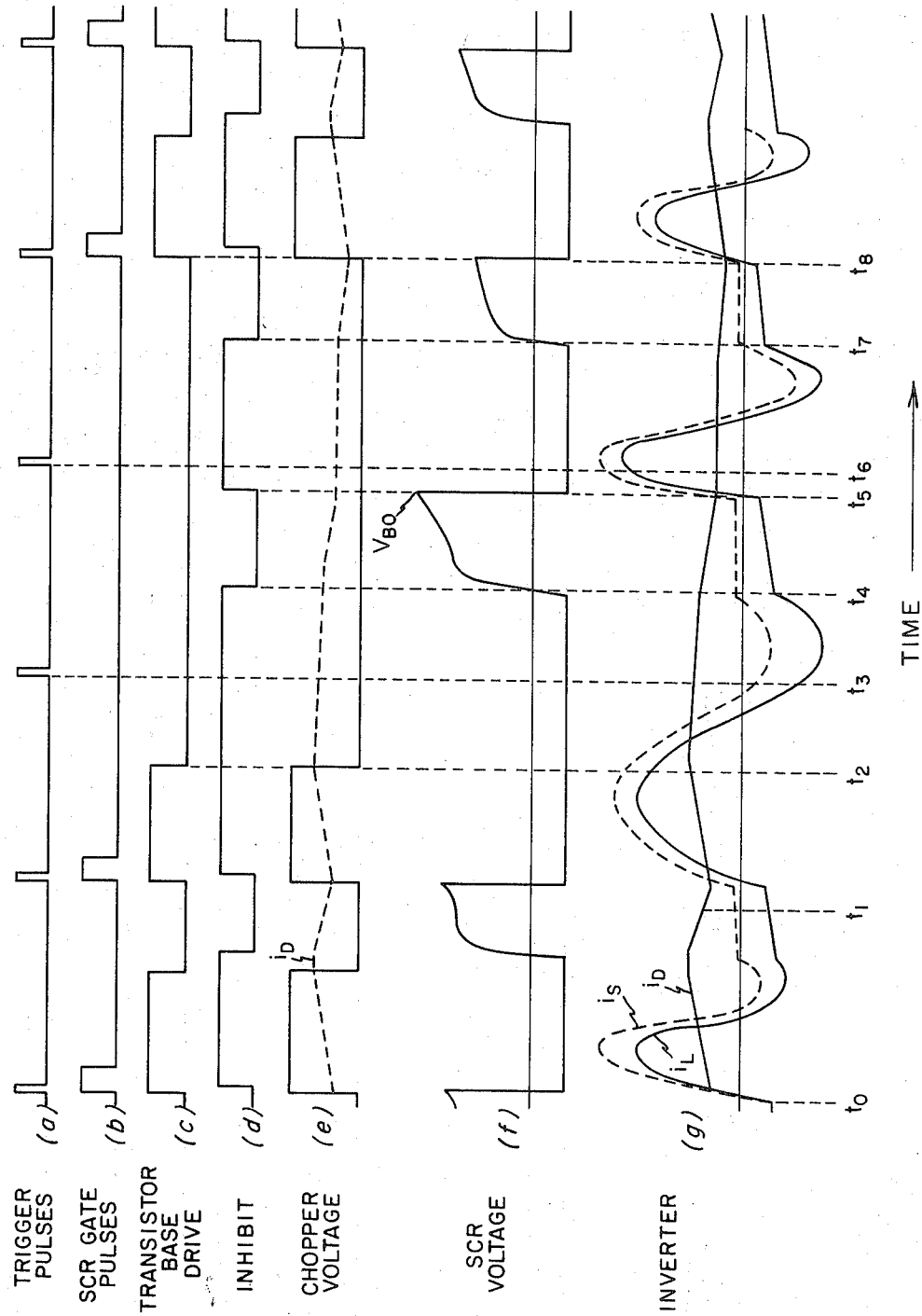

FIG. 5 illustrates waveforms associated with a miscommutation caused by a transient reactive load, for example, which lowers the resonant frequency of the load circuit. In FIG. 5, the first cycle illustrates normal operating conditions. However, during the second cycle, the commutation which should have occurred at time $t_2$ actually occurs at time $t_4$. Since the instantaneous voltage across the SCR was below the threshold voltage at time $t_3$, the inhibit signal remained throughout this period and no new SCR gate pulse or transistor drive pulse was initiated at time $t_3$. The commutating capacitor 15, however, begins to charge as a result of current $i_D$ at time $t_4$ after SCR 12 recovers its blocking voltage. The commutating capacitor 15 charges from the current $i_D$ for a time much larger than normal so that the voltage on the capacitor would rise to a much higher voltage level if permitted to charge until the next trigger pulse occurs at time $t_6$. However, at time $t_5$, the SCR breakover voltage, $V_{BO}$, is exceeded and the SCR conducts in a more-or-less normal load current cycle. The transistor base drive pulse which would have occurred at times $t_3$ and $t_6$ are inhibited so that no new energy is delivered to the inductor 17 to increase the current $i_D$ during the time period $t_3$ to $t_7$. This causes the current $D$ to remain at a relatively low value so that commutating capacitor 15 charges to a near normal value in time for the next gating pulse at time $t_8$. If at time $t_8$, the load returns to its normal condition, the inverter will continue to operate in it normal mode. If, however, the abnormal reactive impedance load remains, the wave shapes illustrated in FIG. 5 will be repeated until the impedance returns to normal.

It should be noted that during the entire time in which an abnormal reactive load exists, none of the currents flowing in the inverter circuit are abnormally high even though this type of commutation failure causes the gating pulses to lose control of the inverter output frequency for one of two cycles. Further, the protective control means is able to provide some output power even during the time of disturbance. The protective control means therefore permits an SCR inverter to continue to operate after a commutation failure by promptly and automatically restoring inverter operation without maintenance. This feature of our invention allows the inverter to operate reliably with small margins in commutation energy storage even where load impedances are very erratic and often undefined. Still another advantage of our invention is the ability to avoid abnormally high currents which might otherwise overstress the component capabilities, thereby compromising the ultimate reliability of the inverter.

In summary, we have disclosed a novel protective control means for an SCR inverter which promptly and automatically restores inverter operation after a commutation failure by sensing the instantaneous voltage across the SCR and comparing this voltage with a threshold voltage for providing an inhibit signal when the instantaneous voltage of the SCR is below the threshold voltage. This inhibit signal prevents further triggering of the SCR until the instantaneous voltage exceeds the threshold voltage.

In view of the foregoing description, those skilled in the art can readily appreciate that numerous modifications and variations of our invention are possible. For example, although our invention has been described with reference to a single SCR inverter, other inverters which employ a fast-acting switch in the D.C. current path may also be used. Further, in inverters employing two or more SCR's, the protective control means of the present invention serves to block input power pulses unless there is a voltage across at least one of the two SCR's. Still further, those skilled in the art can appreciate that upon the occurrence of a commutation failure, it is not necessary to inhibit both the SCR and the chopper, it is sufficient to inhibit only the chopper. It is therefore to be understood that still other changes may be made in the particular embodiments of the invention described which fall within the full intended scope of the invention as defined by the appended claims.

What we claim as new and desire to secure by Letters Patent of the United States is:

1. An improved direct current-to-alternating current inverter comprising:
   an SCR;
   a series resonant circuit operatively connected with said SCR;
   a current controlling means having one terminal operatively connected to said SCR and another terminal adapted to be connected to a source of direct current;
   control means for providing gating signals to said SCR and said current controlling means to control the flow of current therethrough; and
   means for inhibiting at least the gating signals to said current controlling means upon the occurrence of a commutation failure of said SCR, said means for inhibiting including means for sensing the instantaneous voltage across said SCR.

2. The inverter of claim 1 wherein said means for inhibiting further includes means for comparing the instantaneous voltage across said SCR with a threshold voltage, said means for comparing providing an inhibit signal for said control means whenever the magnitude of said instantaneous voltage is less than said threshold voltage.

3. The inverter of claim 2 wherein said means for comparing comprises an operational amplifier having a first input connected to the anode of said SCR and a second input connected to the cathode of said SCR for sensing the instantaneous voltage across said SCR.

4. The inverter of claim 3 further including:
   a source of a threshold voltage; and
   means coupling said threshold voltage to said means for comparing.

5. The inverter of claim 1 wherein said series resonant circuit includes a capacitor and an inductor in series with a load and said current controlling means includes resistive means connected between said terminals for charging said capacitor after the occurrence of a commutation failure.

6. The inverter of claim 1 wherein said means for inhibiting inhibits the gating signals to said current controlling means and said SCR.

7. A method of protecting a direct current-to alternating current inverter in the event of a commutation failure wherein said inverter includes a current controlling device adapted to be connected between a series resonant circuit and a source of direct current with an SCR connected in parallel with said series resonant circuit, said method comprising:
   sensing the instantaneous voltage across said SCR;
   comparing the instantaneous voltage across said SCR with a threshold voltage;
   inhibiting the current flow through said SCR when the instantaneous voltage across said SCR is less than said threshold voltage; and
   automatically restoring current flow through said SCR when the instantaneous voltage across said SCR is greater than said threshold voltage.

8. The method of claim 7 wherein the step of automatically restoring current flow through said SCR includes:
   applying a charging current to said series resonant circuit for developing therein a voltage greater than said threshold voltage.

9. The method of claim 8 wherein the step of automatically restoring current flow through said SCR further includes:
   generating gating signals to said SCR and said current controlling device after said threshold voltage is exceeded.

* * * * *